No. 612,326. Patented Oct. 11, 1898.
M. E. FULD.
ELECTRIC BATTERY.
(Application filed Aug. 4, 1897.)
(No Model.) 2 Sheets—Sheet 1.
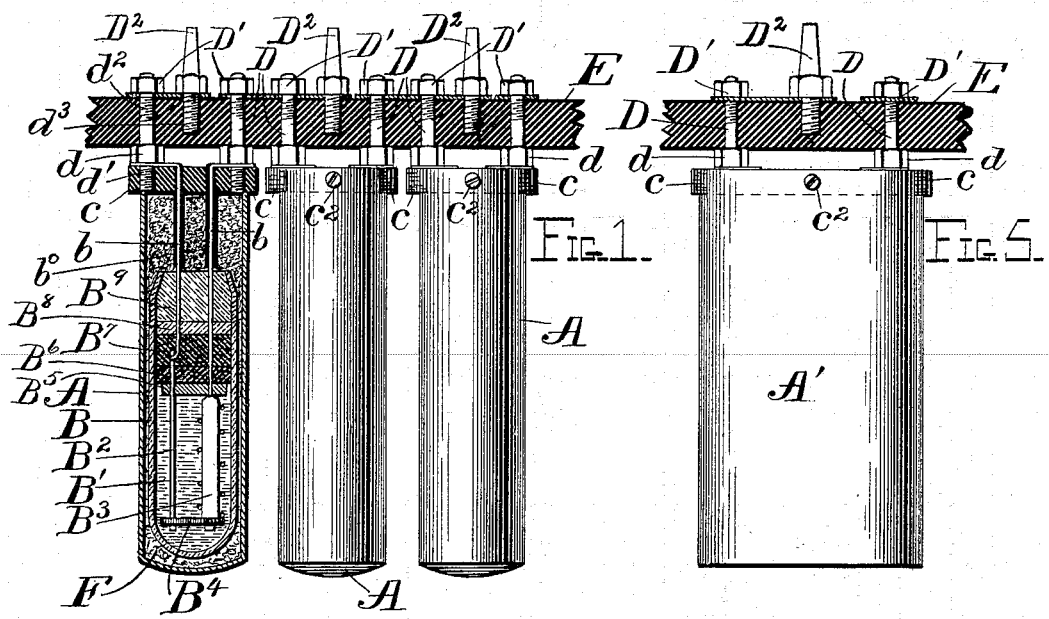
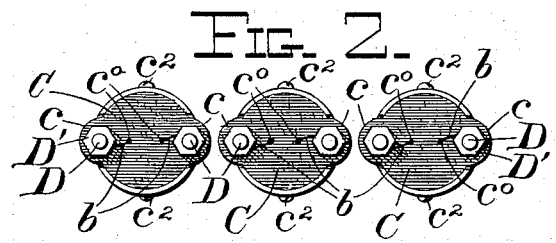
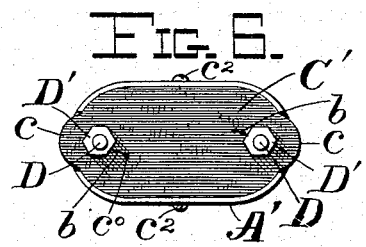
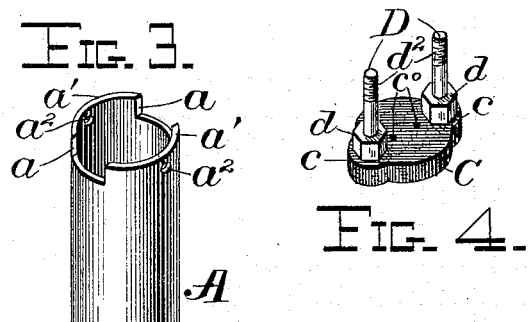
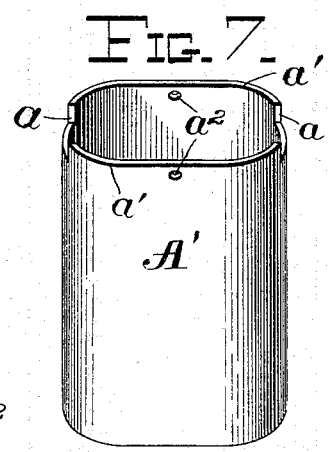
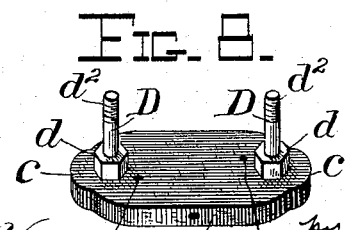
Witnesses
Percy C. Bowen.
John C. Wilson.
Inventor
M. E. Fuld,
by Wilkinson & Fisher
Attorneys.
THE NORRIS PETERS CO., PHOTO-LITHO., WASHINGTON, D. C.

No. 612,326. Patented Oct. 11, 1898.
M. E. FULD.
ELECTRIC BATTERY.
(Application filed Aug. 4, 1897.)
(No Model.) 2 Sheets—Sheet 2.
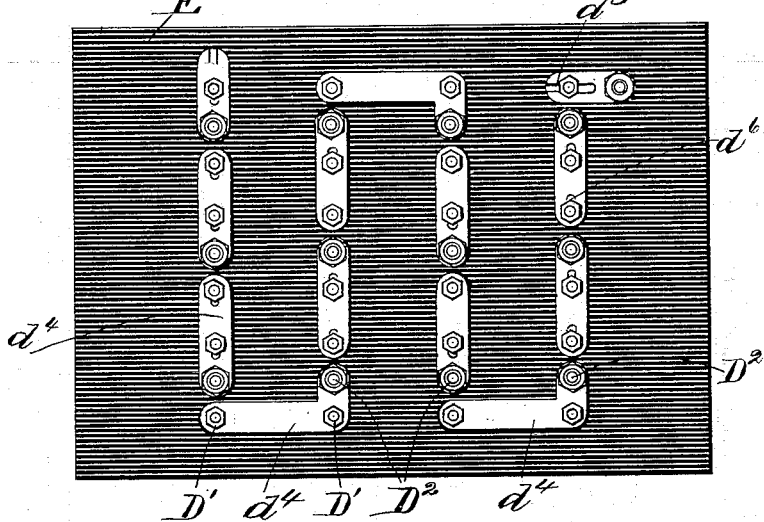
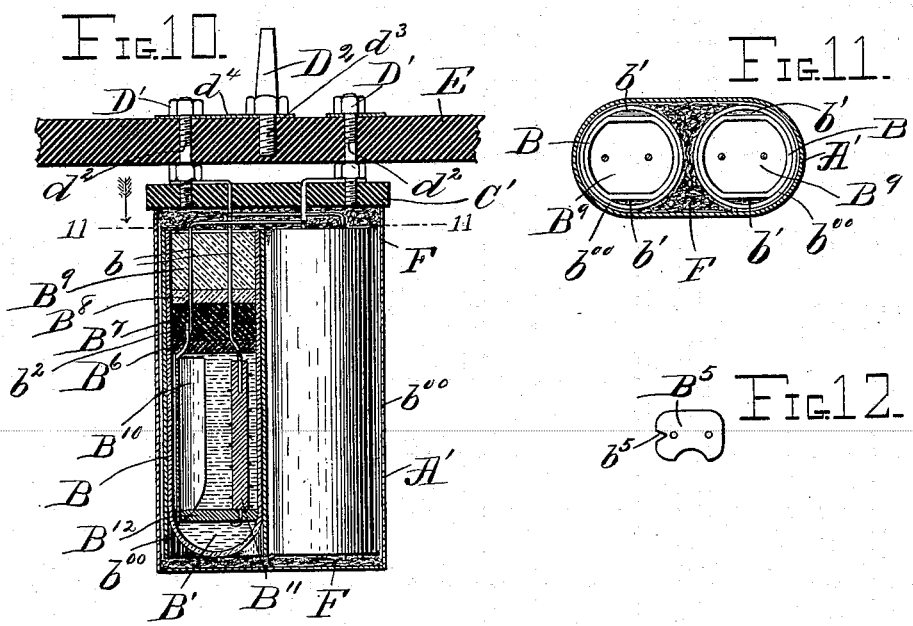
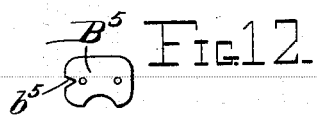
Witnesses
John H. Holt.
D. H. Blakelock.
Inventor
M. E. Fuld
by Wilkinson & Fisher.
Attorneys

UNITED STATES PATENT OFFICE.

MANES E. FULD, OF BALTIMORE, MARYLAND.

ELECTRIC BATTERY.

SPECIFICATION forming part of Letters Patent No. 612,326, dated October 11, 1898.

Application filed August 4, 1897. Serial No. 647,075. (No model.)

*To all whom it may concern:*

Be it known that I, MANES E. FULD, a citizen of the United States, residing in the city of Baltimore, in the State of Maryland, have invented certain new and useful Improvements in Electric Batteries; and I do hereby declare the following to be a full, clear, and exact description of the invention, such as will enable others skilled in the art to which it appertains to make and use the same.

My invention relates to improvements in electric-battery cells and means for packing the said cells, and especially to "dry-cell" batteries, whereby a group of cells may be suitably secured to the cell-support, and yet each cell may be conveniently removed and another cell substituted therefor. As the life of the small dry cells used in such batteries is more or less limited and the battery or the individual cells thereof must be frequently renewed by the substitution of new cells for the old, it is desirable that the cells be secured to the support in such a manner as to be readily placed in position and removed, so as to secure the proper connections with certainty and without necessitating either the return of the battery to the factory or special skill on the part of the operator. Moreover, it is desirable that the cell-cases and other detachable parts may be used over and over again, the cells themselves only being renewed.

My invention further embraces a novel method of sealing the cells and also the improved method of connecting the separate cells of a battery together.

My invention embodies other novel features, all of which will be understood by reference to the accompanying drawings, in which the same parts are indicated by the same letters throughout the several views.

Figure 1 is a vertical sectional view of a portion of the cell-support, showing three cells suspended therefrom, one of the cells being shown in central vertical section. Fig. 2 represents a plan view of the three cells shown in Fig. 1, the cell-support being omitted. Fig. 3 is a perspective view of one of the cell-cases. Fig. 4 represents a perspective view of the insulating-cap for one of the cell-cases shown in Figs. 1 to 3. Fig. 5 represents a vertical sectional view of a cell-support with a larger cell-case suspended therefrom, which cell-case is intended to contain a plurality of cells. Fig. 6 represents a plan view of the cell-cases hown in Fig. 5 as detached from the cell-support. Fig. 7 represents a perspective view of the cell-case shown in Figs. 5 and 6 with the cap removed. Fig. 8 represents a perspective view of the insulating-cap for the cell-case shown in Figs. 5 to 7. Fig. 9 is a plan view of the cell-support, showing the arrangement of the contacts or connections between cells. Fig. 10 is a vertical sectional view of a portion of the cell-support, showing one of the large cell-cases suspended therefrom and containing two cells, one of which is shown in central vertical section. Fig. 11 represents a section taken along the line 11 11, Fig. 10, and looking in the direction of the arrow; and Fig. 12 is a plan view of the insulating-plate separating the upper ends of the elements shown in Fig. 1.

Referring now particularly to Figs. 1, 2, and 4, A represents a cell-case made, preferably, of metal and having its upper edges $a'$ notched or recessed, as at $a$, and provided with screw-holes $a^2$. (See Fig. 3.)

B represents the cell, which is preferably of glass or porcelain and may be made either of the ordinary cylindrical form or its neck may be compressed in the form of a truncated cone, as shown in Fig. 1.

B' represents the electrolyte, preferably a zinc-sulfate solution, though other solutions if found better adapted may be employed, in which the zinc element $B^2$ and chlorid-of-silver element $B^3$ are immersed, which elements are prevented from touching each other by means of the insulating-pieces $B^4$ and $B^5$, secured to each end of the elements. (See Fig. 1.) These pieces $B^4$ and $B^5$ are notched, as at $b^5$, to prevent them from expanding and breaking the cell. The upper ends of the elements are connected to the terminals $b$, which pass through the rubber sleeves $b^0$ and then through the openings $c^0$ in the cap C, having their ends finally secured beneath the lugs $d$, which are made integral with the rods D. The cells are provided with four sealing-plugs, the bottom one $B^6$ being a hard seal composed of resin and gutta-percha melted and poured into the cell, the said seal becoming hard when cool.

Obviously a seal of leather or pasteboard could be used at this point. Over this seal is a soft sticky seal $B^7$, composed of resin dissolved in resin-oil, though molasses, varnish, or the like may be used instead of the resin solution. After the soft seal has been inserted a thin layer of plaster-of-paris is placed on top of it and upon setting forms the seal $B^8$. This, too, might be replaced by a disk of leather or pasteboard. Then after the seal $B^8$ has become hard the thick seal $B^9$ of plaster-of-paris is inserted and allowed to set. The lower plaster seal relieves the pressure of the heavy top seal $B^9$ upon the soft seal $B^7$. Obviously other plastic substances may be substituted for the plaster-of-paris.

Whenever the cells have not the shape of a truncated cone at their upper ends or the seals are not otherwise prevented from coming out, the upper edge of the cell is indented on each side, as seen most clearly at $b'$, Fig. 11. This indentation in the glass of the cell being simply a means for preventing the seals from coming out may obviously be replaced by any other convenient means for accomplishing the same result.

The caps C are provided with ears $c$, adapted to fit into the recesses $a$ of the cell-cases, and the cap is intended to be flush with the upper edge $a'$ of the cell-case A. The cap is held in place by screws $c^2$, passing through the screw-holes $a^2$. These caps are preferably made of vulcanized fiber; but ebonite or other suitable insulating material may be used, if desired. The cell is suspended from the cap by means of the terminals $b$, and it is held in place in the cell-case and prevented from being broken by violent contact with the sides of the cell-case by means of the absorbent packing F. This packing is made absorbent, so that in case the inner cell is broken by pressure of gases generated by the electrolytic action or by accident, or in case any of fluid in the cell is forced out through the sealing, this absorbent packing may prevent the same from leaking out past the cap to the injury of the other parts of the apparatus.

Each cell-case is suspended from the cell-support E by means of the rods D, which serve not only as supports to the cell-case, but also as enlarged terminals or binding-posts. The lower end of each of these rods D is screw-threaded, as at $d'$, and screws into the cap C, (see Fig. 1,) while the lug or boss D, preferably made angular for convenience in screwing down the rod, is adapted to bear on and hold the terminal $b$ down firmly on the cap C, as shown in Fig. 1. The upper end of the rod D is also preferably screw-threaded, as at $d^2$, to engage the nut D', by means of which the said rod is held in the cell-support E. Instead of this screw-threaded portion $d^2$ and the nut D' any convenient means of detachably connecting the rod D to the cell-support E may be adopted, if desired.

$D^2$ represents terminal contact-posts, screw-threaded, as at $d^3$, and adapted to screw into the supporting-plate E from above. Metallic contact-strips $d^4$, provided with slots $d^5$ for the admission of the terminals, are adapted to connect the terminals of the cells to each other and to the said terminal posts, all of which is most clearly shown in Figs. 1 and 9. The arrangement of the terminal posts, as shown, is simple, strong, and effective.

Referring now particularly to Figs. 5 to 8 and 10, the cell-case A' is made large enough to contain two or more cells, which may be connected together in series or multiple, as is well known in the art, within the cell-case and have their terminals connected to the single pair of rods D. (See Figs. 5, 6, 8, and 10.) In other respects the insulating-cap is secured in the cell-case and connected to the cell-support in the same manner as has been already described with reference to Figs. 1 to 4.

In Fig. 10, which is a vertical central section of one of the double cell-cases and cells, $B^6$, $B^7$, $B^8$, and $B^9$ represent sealing-plugs similar to those before shown and described in connection with Fig. 1. The zinc electrode $B^{10}$ is in this case semicircular in cross-section, or approximately so, being the same in that respect as the zinc electrode shown and described in the patent to Charles Willms, No. 554,759. The glass cells are inclosed in the pasteboard wrappers or cylinders $d^{00}$, which prevents adjacent cells from striking each other and reduces the liability of breakage. The electrodes are held apart at their lower ends by the insulating-piece $B^{12}$. Absorbent packing is placed above and below the cells to prevent breakage and to absorb any liquid which may find its way to the interior of the cell-case.

From the foregoing it will be evident that each cell-case, with the cell or cells inclosed, may be readily detached from the cell-support without disturbing the other cell-cases and that a new cell-case, with cell or cells inclosed, may be substituted therefor. Furthermore, it will be evident that the caps to the cell-cases may be readily removed when desired, and the contents of the cell-cases may be readily changed, and thus the same cell-cases, caps, &c., may be used over and over again. It is obvious also that the cell proper is capable of many modifications which may be made without departing from the spirit of my invention.

Having thus described my invention, what I claim, and desire to secure by Letters Patent of the United States, is—

1. The combination with a cell-case, provided with recesses at its upper edge, of an insulating-cap perforated to receive the terminal wires and having ears adapted to project into said recesses, screws or pins projecting through the sides of said case into said cap, and rods detachably connected to said cap and adapted to serve as supports for the cell-case and as enlarged terminals for the cell or cells contained in the cell-case, substantially as described.

2. The combination with a cell-case provided with recesses at its upper edge, of an insulating-cap perforated to receive the terminal wires of the cell, and flush with the top of said cell-case, the said cap having ears projecting into said recesses, screws or pins projecting through the sides of the cell-case into said cap, and rods screwed into said cap and adapted to serve as supports for the cell-case, and as enlarged terminals for the cell or cells contained in the cell-case, substantially as described.

3. The combination with an insulating cell-support, of a cell-case provided with recesses at its upper edge, an insulating-cap, perforated to receive the terminal wires, and having ears integral therewith adapted to project into the recesses in the cell-case, screws or pins projecting through the sides of said case into said cap, and rods detachably connected in said cap and to said cell-support, and adapted to serve as supports for the cell-case, and as enlarged terminals for the cell or cells contained in the cell-case, substantially as described.

4. The combination with an insulating cell-support, of a cell-case provided with recesses in the upper edge thereof, an insulating-cap having ears adapted to project into the recesses in the cell-case, and perforated to receive the terminal wires of the cell or cells contained in the cell-case, screws or pins projecting through the sides of said case into said cap, rods screwed into said cap and screw-threaded along their upper ends and adapted to project through the cell-support, said rods being adapted to serve as supports for the cell-case, and as enlarged terminals for the cell or cells contained in the cell-case, and nuts engaging the screw-threaded ends of said rods above the cell-support, substantially as described.

5. A battery-cell of the character described, having non-conducting separating-plates supported by the elements of said cell approximately at the upper and lower ends of said elements and separating them from each other and holding them at a fixed distance apart, the said plates each being recessed at one end where they contact with the cell to compensate for expansion, substantially as described.

6. In a cell of the character described, the combination with the elements, of the non-conducting notched plates separating the same, a hard sealing-plug just outside the battery fluid, a viscous plug resting upon said hard plug, a supporting plaster plug above said viscous plug, a sealing plaster plug above and resting upon said supporting-plug, indentations at the top of said cells to prevent the displacement of said seals, a cell-case inclosing one or more of said cells, a non-conducting cap closing the upper end of said cell-case, enlarged supporting-terminals secured to the said non-conducting cap, the terminals from said elements connected to said supporting-terminals, and said supporting-terminals adapted to be secured to the cell-support, substantially as described.

7. The combination with the cells of an electric battery, of cell-cases inclosing said cells, said cell-cases being provided with recesses in their upper edges, caps inclosing the upper ends of said cell-cases and extending into said recesses, enlarged supporting-terminals screwed into said caps, a cell-support and removable devices securing the said terminals to the said support, substantially as described.

8. The combination with the cells of an electric battery, of cell-cases inclosing said cells, said cell-cases being provided with recesses in their upper edges, caps closing the upper ends of said cases, said caps being provided with ears which project into said recesses, enlarged supporting-terminals screwed into the said caps and having their upper ends screw-threaded, a cell-support with the said enlarged terminals passing therethrough, and nuts adapted to engage the upper screw-threaded portion of said terminals and secure the same to said cell-support, substantially as described.

9. The method of forming a battery-cell, which consists in partly filling the cell-case with an electrolyte, inserting the elements therein at proper distances apart; inserting a plastic seal and allowing the same to harden; inserting above this seal a viscous plug; inserting above said viscous plug a thin layer of plaster-of-paris under a slight pressure, allowing this layer to harden; inserting above this layer a thicker layer of plaster-of-paris under pressure and indenting the upper end of the cell-case to prevent the said seals from becoming displaced, substantially as described.

In testimony whereof I affix my signature in presence of two witnesses.

MANES E. FULD.

Witnesses:
PHILIP SEIBERT,
ROBT. A. ANDREWS.